Feb. 20, 1962 J. L. NYGAARD ET AL 3,022,421

AUTOMATIC GAIN CONTROL SYSTEM

Filed April 2, 1957 2 Sheets-Sheet 1

INVENTORS
JAMES L. NYGAARD AND
ROGER R. WEBSTER
BY Stevens, Davis, Miller & Mosher
ATTORNEYS Feb. 20, 1962 J. L. NYGAARD ET AL 3,022,421

AUTOMATIC GAIN CONTROL SYSTEM

Filed April 2, 1957 2 Sheets-Sheet 2

INVENTORS
JAMES L. NYGAARD AND
ROGER R. WEBSTER
BY Stevens, Davis, Miller & Mosher
ATTORNEYS 3,022,421
Patented Feb. 20, 1962

3,022,421

AUTOMATIC GAIN CONTROL SYSTEM

James L. Nygaard and Roger R. Webster, Dallas, Tex., assignors to Texas Instruments Incorporated, Dallas, Tex., a corporation of Delaware Filed Apr. 2, 1957, Ser. No. 650,126
3 Claims. (Cl. 250—20)

This invention relates to circuits for automatically controlling the gain of signal-receiving systems. More specifically, this invention relates to a voltage sensitive non-linear resistance device and its biasing circuit in combination with the normal automatic gain control of a radio receiver for maintaining a substantially constant output signal level with input signal amplitudes to the receiver antenna beyond the range of the normal gain control circuit.

This application is a continuation-in-part of our co-pending application S.N. 541,953 filed on October 21, 1955, now Patent No. 2,981,835, issued April 25, 1961.

In the transmission of signals, for example radio frequency signals, the amplitude diminishes rapidly after leaving the transmitting antenna so that the strength of the signals received by the antenna of a radio receiver is a function of the distance of the receiving antenna from the transmitting antenna. Thus, where the tuning of a radio receiver is changed from that of a distant transmitting station to a nearby transmitting station the signals at the receiver antenna will change from low to high amplitude; or where the receiver is moving toward a transmitting station such as in an automobile, the signals will gradually increase in amplitude. Depending upon the power of the transmitting antenna and the proximity of the receiving antenna, it is possible to receive signals of such amplitude that the first amplification stage or stages of the receiver will be overloaded to the point where no recognizable output can be obtained. This signal strength factor has been solved more or less satisfactorily in vacuum-tube radios by the use of variable gain remote cutoff vacuum-tubes which are capable of handling large signals without overload at reduced gain. The problem is present to a much greater extent in transistor radios for the reason that present transistors are essentially sharp cutoff devices and, in common with sharp cutoff vacuum-tubes, cannot handle large signals at reduced gain because of the extreme curvature of the transfer characteristics when operating near cutoff (low gain).

Various automatic gain control circuits, well-known in the prior art, have been associated with the receiver antenna and tuning circuit to reduce the signal level input to the first or radio frequency amplifier stage of the receiver. These automatic gain control circuits, referred to hereinafter as AGC circuits, fall within either one or the other of two general types of circuits. In the first type, a variable resistance device whose resistance decreases with increasing signal level is connected in shunt with the input tuning circuit to the first amplification stage of the receiver. The second type of circuit uses a variable resistance device whose resistance increases with increasing signal level and has this device connected in series between the receiving antenna and the tunning circuit for the receiver.

For several reasons, neither type of prior art circuit has been entirely satisfactory. The first type of AGC circuit has used such variable resistance devices as photoelectric cells, glow tubes, neon tubes, and thermistors. These variable resistance devices are variously subject to the objections that a considerable amount of control power is required to control the resistance, that they lack the ability to follow closely changes in signal level, and that they tend to exhibit discontinuous rather than smooth, continuous control. In the second type of AGC circuit, the variable resistance in series between the antenna and the tuning circuit for the receiver cannot be used with a loop-type antenna circuit. Perhaps most important of all, in both types of circuits the range of signal level control available is limited by the resistance range of the variable resistance device; consequently when the resistance range of the device has been exceeded, the AGC circuit no longer functions to control the signal level.

The present invention falls generally within the type of AGC circuit in which the variable resistance device is connected in shunt across a parallel tuned input circuit to one of the amplification stages of the receiver. However, in place of the prior art variable resistance devices, this invention uses, as a non-linear resistance, a voltage sensitive diode which requires nominal amounts of control power and has the ability to follow closely and smoothly changes in signal level. Since the invention is most applicable to transistor receivers, the diodes in such receivers are p-n junction semi-conductor diodes in which the semi-conductor material may be either germanium or silicon. A first and substantially fixed reference voltage is applied to one element of the diode. A second voltage, variable in accordance with the input signal strength, is applied to the other element of the diode but of such magnitude and with such a polarity as to bias the diode substantially against conduction under conditions of normal signal strength. When the signal is below a predetermined level, the fixed reference voltage will be sufficient to prevent any substantial conduction of the diode and, consequently the diode has very little or no effect below this level; the signal control in the radio receiver will therefore be by means of the normal AGC circuit. However, as the incoming signals increase in strength above the predetermined level, the variable voltage applied to the diode reaches a certain level relative to the fixed reference voltage, and the diode, then being in a conductive condition, takes over the signal level control of the receiver. By affecting the impedance loading on the inductance coil of the parallel tuned circuit, the diode by-passes a portion of the signal in proportion to the amplitude and thus reduces the amplitude of the signals supplied to the amplification stage or stages beyond the diode.

In our aforementioned U.S. Patent No. 2,981,835, the automatic gain control system employing the diode was connected across the input circuit of the first RF stage; i.e. the diode was connected across the antenna coil so as to shunt a portion of the signal to ground when the signal exceeded a certain predetermined level. The present invention, as set forth herein, employs the diode for a similar purpose; however, in the instant invention a diode is connected across the input transformer to the first IF stage rather than across the antenna coil as in the aforementioned copending application.

Accordingly, it is a principal object of this invention to provide a voltage sensitive, non-linear resistance device for extending the signal control range of the normal AGC circuit of a receiving system whereby the normal AGC circuitry controls the signal level in the receiver until a predetermined level is reached and thereafter signal level control is accomplished by means of the non-linear resistance device.

It is another object of this invention to provide an AGC System for signal receiving sets of the transistor type although applicable as well to receiving systems of the vacuum tube types.

It is another object of this invention to provide a signal receiver with a circuit that, for signals above a predetermined level, shall control the gain of an amplifier in the receiver by varying the load impedance of the input circuit to that amplifier.

It is still another object of this invention to provide a voltage sensitive diode with non-linear resistance characteristics for reducing the amplitude levels of input signals to the first IF stage of a signal receiving system.

It is a further object of this invention to provide a voltage sensitive, non-linear resistance diode requiring minute amounts of control power and having the ability to follow smoothly and rapidly changes in signal level control.

Other and further objects and advantageous features of this invention will hereinafter more fully appear in connection with a detailed description of the drawings in which.

Figure 1:
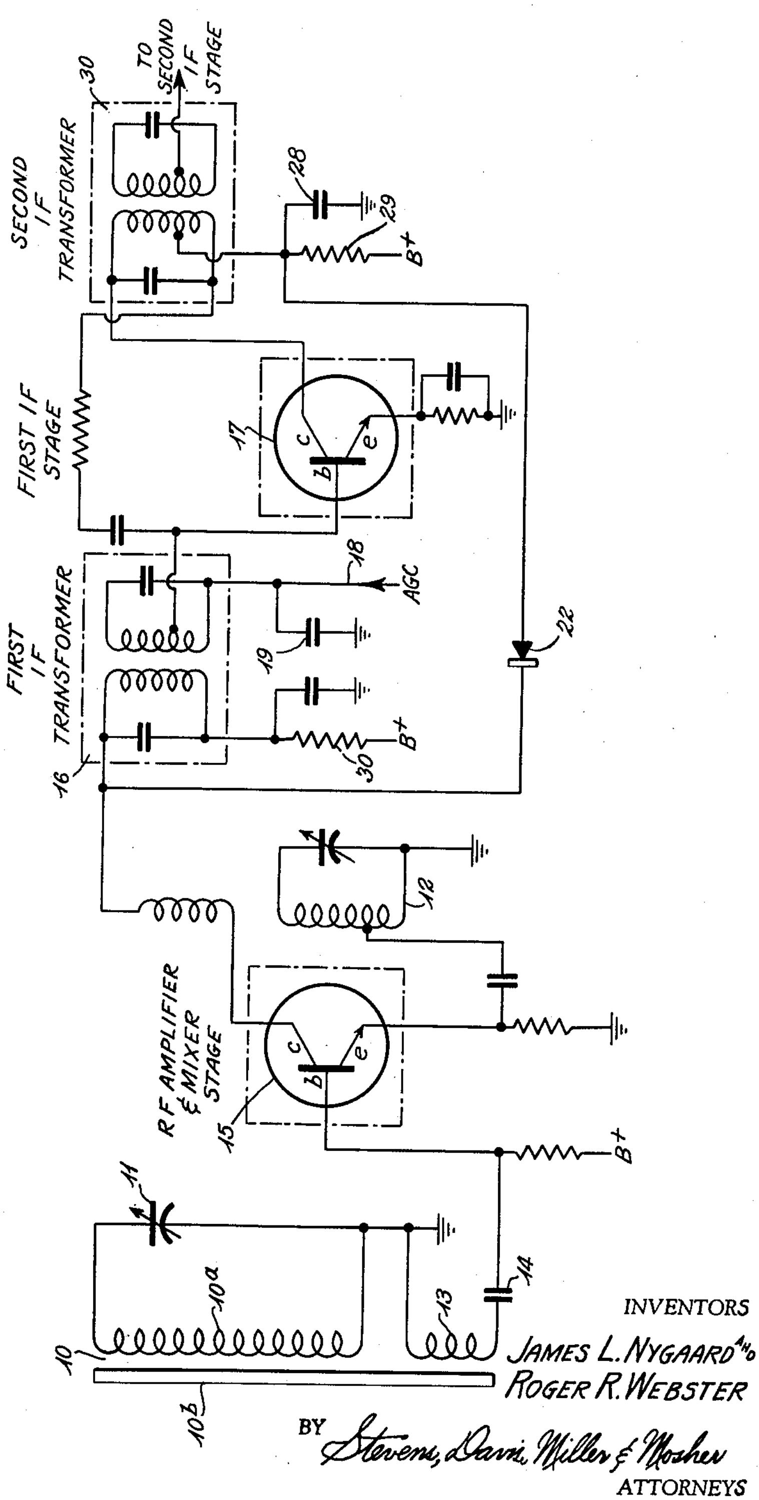
FIGURE 1 is a schematic diagram of a portion of a radio receiver employing the automatic gain control circuit of this invention.

Referring now to FIGURE 1, only that portion of a signal-receiving system, represented as a radio receiver, necessary to describe the present invention is shown. The transistors which are used in the radio receiver circuit of FIGURE 1 are of the n-p-n type; therefore, in discussing the voltage applied to the transistors in regard to FIGURE 1, terms employed will be the voltage polarities appropriate for transistors of this type. However, it should be understood than p-n-p transistor such as is used in the RF amplifier and mixer stage of FIGURE 2, could be used in place of any of the n-p-n transistors by reversing the D.C. polarities of the voltage as discussed, or alternatively, the amplifying elements of the radio receiver could be vacuum tubes in place of transistors. In like manner, the non-linear resistance styled diode elements will be discussed in terminology appropriate for a p-n junction semi-conductor diode, although a vacuum tube diode could be suitably substituted in its place.

Radio-frequency signals are received by an antenna 10, the antenna being shown as comprised of an antenna coil **10*a* and a ferrite core 10*b*. In parallel with the antenna 10 is a variable capacitor 11 which forms a parallel tuned circuit in which the variable capacitor 11 tunes the circuit to resonance at the desired signal frequency. It should be recognized at this point that this invention is not limited to the ferrite coil antenna as shown since the radio frequency signals can be received by any conventional antenna, and sent, for example, to a parallel tuned circuit comprised of coil 10*a* and variable capacitor 11**.

A second coil 13 is wound on the ferrite core **10*b* and the voltages corresponding to the radio frequency signals received at the antenna are induced in this coil 13 and fed through a blocking capacitor 14 into the base of the transistor 15. Coil 13 has a smaller number of coil turns than coil 10*a* in order to provide an impedance match between the high impedance of the parallel-tuned circuit at resonance and the low impedance of the base of transistor 15. Transistor 15, as shown, serves as the radio frequency amplifier and mixer stage, and receives at its emitter the output of an oscillator circuit generally indicated as 12. As is well known, in super heterodyne receivers, the oscillator frequency is mixed with the input signal frequency to produce an intermediate frequency, usually of 455 kilocycles, although 262 kilocycles is another common intermediate frequency. The intermediate frequency signals from transistor 15 are coupled into the base of a transistor 17, which is the first intermediate frequency amplifier stage of the receiver, through the double-tuned intermediate frequency transformer 16. Transistor 17, like transistor 15, has a low impedance, and thus, the input lead to the base is tapped down on the secondary coil of the transformer 16 to provide an impedance match with the output of transistor 15. In order to bias the n-p-n transistor 17 for amplification, the emitter-base diode is biased in the forward direction, and the collector-base diode is biased in the reverse direction. Therefore, to obtain the proper bias conditions, the D.C. emitter voltage of transistor 17 is negative with respect to the base. The intermediate frequency signals are sent from transistor 17 to a second double-tuned intermediate frequency transformer 30, through one or more succeeding stages of intermediate frequency amplification, and from there to a detector (not shown). In the detector, the audio-frequency signals are first detected and then coupled into a conventional audio-frequency amplifier and sound reproducer (not shown). In addition, the detector produces a negative D.C. voltage proportional to the signal level received, which voltage is fed back as a negative AGC voltage to the base of transistor 17 through line 18 and the series-connected secondary of transformer 16. By-pass condenser 19 is connected into line 18 to provide a low-impedance path to ground for A.C. signals (both audio-frequency from the detected signal and radio frequency from transformer 16**).

To form the second AGC circuit, according to the present invention, a p-n junction semi-conductor diode 22 is connected in shunt across the primary of IF transformer 16. The cathode (left-hand side) of the AGC diode 22 is held just slightly below B+ voltage by the quiescent collector current of the first transistor 15 flowing in resistor 30. The anode of the diode 22 is held about one volt below the cathode by the quiescent collector current of the second transistor 17 as represented by the current flowing in the resistor 29.

When the signal strength in the detector reaches a certain level, the negative AGC voltage is fed back through line 18 to the base of the transistor 17, reducing its gain and decreasing the current flow in the transistor and voltage drop across the collector-resistor 29. Before the incoming signal becomes so strong that the second transistor is driven completely to cut-off by the AGC voltage from the detector, the voltage drop across the resistor 29 has decreased enough so that the diode 22 begins to conduct, because of the more positive bias applied to the anode; therefore, a portion of the input signal to the IF transformer is shunted to ground through the diode 22 and the capacitor 28. Thus, saturation of the IF transformer due to too large an input signal is prevented. Actually, there is no definite signal amplitude at which the normal AGC from the detector ceases to function further and the shunting diode AGC takes over. The gain control load is shared by both of them in varying proportions depending upon the incoming signal strength.

Figure 2:
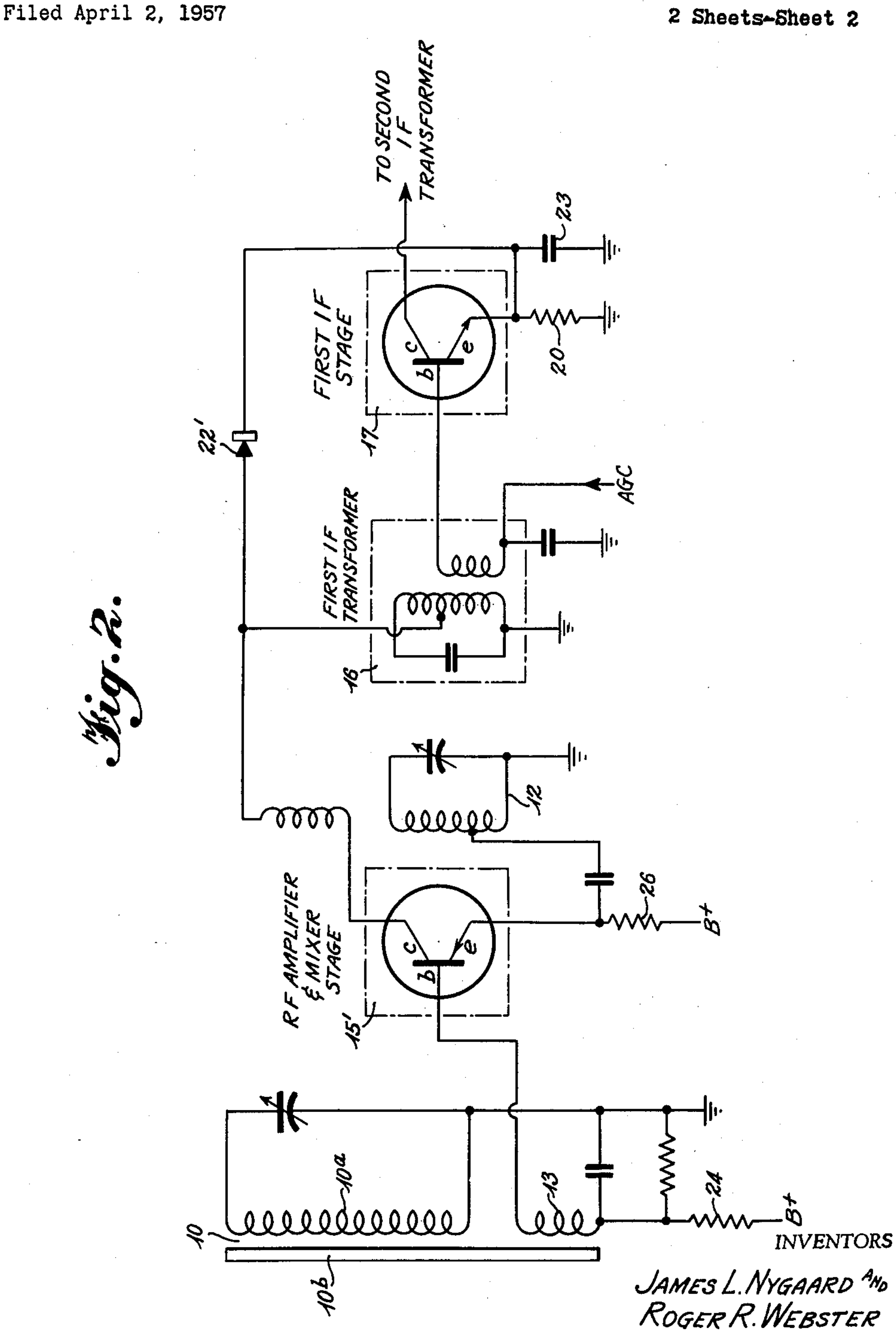
FIGURE 2 is a schematic diagram similar to FIGURE 1 illustrating a second embodiment of this invention.

In FIGURE 2 the circuit is similar to that shown in FIGURE 1; however, in FIGURE 2, the RF amplifier and mixer stage includes a p-n-p type of transistor 15' in which the base is connected to B+ through the coil 13 and resistor 24. The emitter portion of the transistor 15' is connected to B+ through the resistor 26.

In this figure, the anode of a p-n junction semiconductor diode 22' is connected from the center tap of the primary of IF transformer 16, and the cathode of this AGC diode is connected to the emitter portion of transistor 17 at the junction of resistor 20 and capacitor 23. As it appears in this figure, the AGC diode 22' is normally biased in a reverse direction with no signal input to the receiver. When signal is applied, the reverse bias on the diode is reduced with the result that the dynamic resistance of the diode is also reduced. As the resistance of the diode decreases with increasing signal strength, a greater proportion of the input signal will be by-passed from the primary of the IF transformer 16 through the resistor 20 to ground. Although the AGC diode as shown in FIGURE 2 need not be biased in the forward direction for the gain control to function properly, nevertheless it is possible under some conditions of high signal strength for this diode to be biased in the forward direction and thus to act as a near-zero resistance element.

Thus it should be apparent from the above that the present invention provides, in addition to the normal AGC voltage supplied from the detector stage, a second AGC circuit (or variable damping circuit) which is connected across the primary of the coupling transformer between the RF amplifier and mixer stage (or frequency converter stage) and the first IF amplifier stage. Although the circuits illustrated in FIGURES 1 and 2 of the present invention are somewhat different, as indicated in the above detailed description, nevertheless the AGC diode of each figure serves to function with substantially the same end result; i.e., with increasing signal strength each AGC diode (or variable damping device) shunts an increasing proportion of the input signal across the primary of the first intermediate frequency transformer.

Whereas the present invention has been described with particular reference to the accompanying drawings, it should be obvious that other and further modifications apart from those shown or suggested herein might be made with the spirit of this invention.

What is claimed is:

1. In a signal receiving system, a signal translating stage having an input connected to a signal source and having a tuned output, a signal amplifier stage having an input coupled to said tuned output and having an output circuit, a source of automatic gain control voltage connected to said input of said amplifier stage, a voltage-responsive non-linear resistance device, means connecting said resistance device between said tuned output and said output circuit, and means including a substantially fixed voltage for biasing said resistance device toward the low-conduction region of the characteristic thereof, said output circuit presenting a variable voltage to said resistance device, said variable voltage being responsive to said automatic gain control voltage whereby variations in said control voltage tend to change the conductive condition of said resistance device and to thereby change the loading effect presented by said resistance device to said tuned output.

2. Apparatus according to claim 1 wherein said resistance device is a diode.

3. Apparatus according to claim 1 wherein said resistance device is a p-n junction semiconductor diode.

References Cited in the file of this patent

UNITED STATES PATENTS

| | | |
|---|---|---|
| 2,774,866 | Burger | Dec. 18, 1956 |
| 2,802,100 | Beck et al. | Aug. 6, 1957 |

FOREIGN PATENTS

| | | |
|---|---|---|
| 414,187 | Great Britain | Aug. 2, 1934 |